(12) United States Patent
Hamlin et al.

(10) Patent No.: US 11,509,167 B2
(45) Date of Patent: Nov. 22, 2022

(54) WIRELESS DOCKING DEVICE AND METHOD THEREFOR

(71) Applicant: DELL PRODUCTS, LP, Round Rock, TX (US)

(72) Inventors: Daniel Hamlin, Round Rock, TX (US); Manuel Novoa, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 16/795,887

(22) Filed: Feb. 20, 2020

(65) Prior Publication Data

US 2021/0265860 A1 Aug. 26, 2021

(51) Int. Cl.
*H02J 50/00* (2016.01)
*G06F 13/42* (2006.01)
*G06F 1/16* (2006.01)
*H02J 7/00* (2006.01)

(52) U.S. Cl.
CPC .......... *H02J 50/005* (2020.01); *G06F 1/1632* (2013.01); *G06F 13/4282* (2013.01); *H02J 7/0042* (2013.01); *G06F 2213/0042* (2013.01)

(58) Field of Classification Search
CPC .... H02J 50/005; H02J 7/0042; H02J 7/00045; H02J 50/10; H02J 50/80; G06F 1/1632; G06F 13/4282; G06F 2213/0042; G06F 1/1635; Y02D 10/00
See application file for complete search history.

(56) References Cited

U.S. PATENT DOCUMENTS

| | | | |
|---|---|---|---|
| 9,429,992 B1* | 8/2016 | Ashenbrenner | G06F 13/4081 |
| 9,510,140 B2 | 11/2016 | Showering | |
| 10,313,340 B2 | 6/2019 | Wolski et al. | |
| 10,585,815 B2* | 3/2020 | Hall | G06F 1/1632 |
| 10,998,970 B1* | 5/2021 | Passe | H04M 1/72409 |
| 11,209,861 B2* | 12/2021 | Ku | G06F 1/1669 |
| 2012/0287343 A1* | 11/2012 | Kelly | G06F 3/1438 348/554 |
| 2014/0242911 A1* | 8/2014 | Holtman | H01Q 1/243 455/41.1 |
| 2014/0354226 A1* | 12/2014 | Draaijer | H02J 50/05 320/108 |
| 2015/0011160 A1* | 1/2015 | Jurgovan | H04B 5/0031 455/41.1 |
| 2015/0056920 A1* | 2/2015 | Huttunen | H04B 7/26 455/41.2 |
| 2015/0091496 A1* | 4/2015 | Meunier | H02J 50/80 320/108 |
| 2015/0257183 A1* | 9/2015 | Pentelka | H04M 1/72412 455/41.2 |
| 2016/0285299 A1* | 9/2016 | Amand | H02J 50/80 |
| 2017/0003713 A1* | 1/2017 | Israeli | G06F 13/4081 |
| 2017/0171894 A1* | 6/2017 | Cohn | G06F 1/1632 |

(Continued)

*Primary Examiner* — Stacy Whitmore
(74) *Attorney, Agent, or Firm* — Larson Newman, LLP

(57) ABSTRACT

A method may include determining that an information handling system is placed on a wireless charging pad. The wireless charging pad is communicatively coupled to a wireless docking station. The method may further include receiving, at the wireless charging pad, a first unique identifier from the wireless docking station. A wireless dock connection is initiated between the wireless docking station and the information handling system in response to receiving the first unique identifier.

20 Claims, 5 Drawing Sheets

(56) References Cited

U.S. PATENT DOCUMENTS

| | | | | |
|---|---|---|---|---|
| 2017/0177029 A1* | 6/2017 | Nguyen | ............... | G06F 21/445 |
| 2017/0180359 A1* | 6/2017 | Wolski | ................... | H04L 63/10 |
| 2018/0006485 A1* | 1/2018 | Zhu | ..................... | H02J 7/0044 |
| 2018/0219860 A1* | 8/2018 | Wolski | ................... | H04L 63/10 |
| 2018/0370376 A1* | 12/2018 | Liu | ..................... | G05D 1/0225 |
| 2019/0340137 A1* | 11/2019 | Hall | .................... | G06F 1/3231 |
| 2019/0346882 A1* | 11/2019 | Dillow | ................. | G06F 1/1632 |
| 2021/0208631 A1* | 7/2021 | Benson | ................. | H04L 67/34 |
| 2021/0234403 A1* | 7/2021 | Ku | ......................... | H02J 50/80 |

\* cited by examiner

WIRELESS DOCKING DEVICE AND METHOD THEREFOR

FIELD OF THE DISCLOSURE

This disclosure generally relates to information handling systems, and more particularly relates to keeping time in a baseboard management controller.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include determining that an information handling system is placed on a wireless charging pad. The wireless charging pad is communicatively coupled to a wireless docking station. The method may further include receiving, at the wireless charging pad, a first unique identifier from the wireless docking station. A wireless dock connection is initiated between the wireless docking station and the information handling system in response to receiving the first unique identifier.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
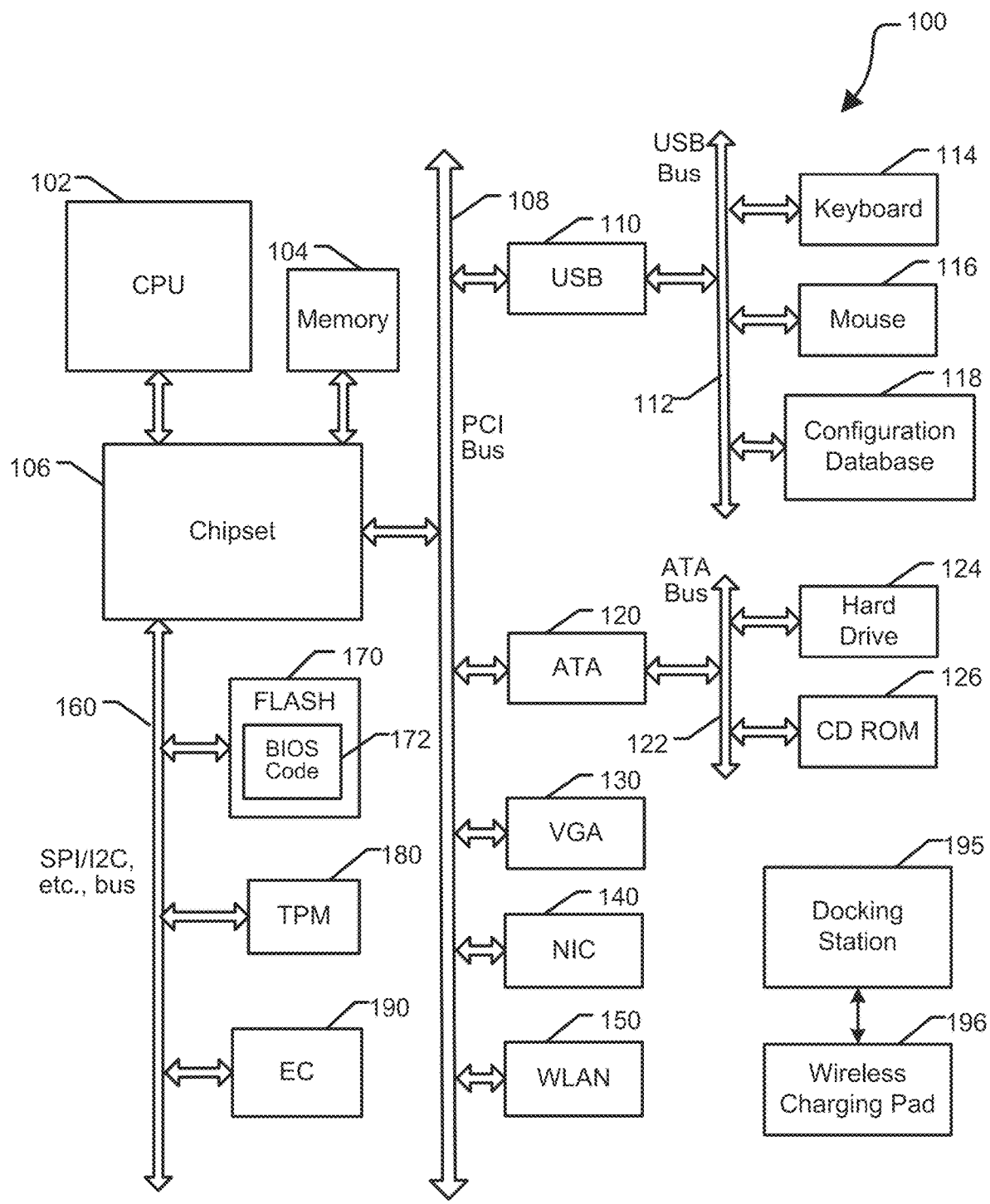
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, an eye-tracking device 118, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial busses 160, a non-volatile rand access memory (NVRAM) 170 for storing a basic input/output system (BIOS) 172, a trusted platform module (TPM) 180, an embedded controller (EC) 190, a docking station 195, and a wireless charging pad 196.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

A docking station, such as docking station 195, may be referred to as a dock, and both terms are used herein interchangeably. Docking station 195 provides a simplified way of connecting an information handling system, such as a laptop computer, to common peripherals, such as a display device, a keyboard, a mouse, and the like. For example, a docking station can allow some laptop computers to substitute for a desktop computer, without sacrificing the mobile computing functionality of the device. In the past, a docking station usually consisted of a proprietary device engineered to mechanically and electrically couple to a specific model of laptop device. Today, a docking station may interface wirelessly with an information handling system using one or more wireless communication protocols, such as WiFi, Bluetooth, and the like. Accordingly, a wireless docking station can now be provided for use as a shared resource. For example, in a work environment a wireless docking station can be provided in a conference room or a shared work area. Moreover, wireless docking stations may be provided for use by the general public, such as in hotels, airports, coffee shops, and the like. In some applications, a wireless docking station may detect multiple information handling systems attempting to establish a wireless dock connection. Techniques disclosed herein provide means for prioritizing wireless connectivity to a docking station.

Wireless charging has recently become popular. Widespread availability of wireless charging technology is in part due to establishing an open interface standard, such as the Qi standard promulgated by the Wireless Power Consortium. A wireless charging pad can complement the convenience provided by a typical dock station work environment. During operation, an information handling system can be placed onto the surface of a wireless charging pad. The wireless charging pad includes power transmission circuitry, while the information handling system includes a corresponding power receiving circuitry. The wireless charging pad and the information handling system typically include circuitry to enable the two devices to communicate wirelessly. When the information handling system is placed onto the wireless charging pad, the wireless communication interface is utilized to negotiate power transfer characteristics and to initiate power transfer. The wireless communication interface can include near-field communication (NFC), Bluetooth, backscatter modulation, and the like. For simplicity, the techniques described below are described in the context of NFC and Qi; however other wireless communication techniques and wireless power transfer technologies can be utilized.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more busses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system, such as Windows, is loaded, computational operation of information handling system can begin.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
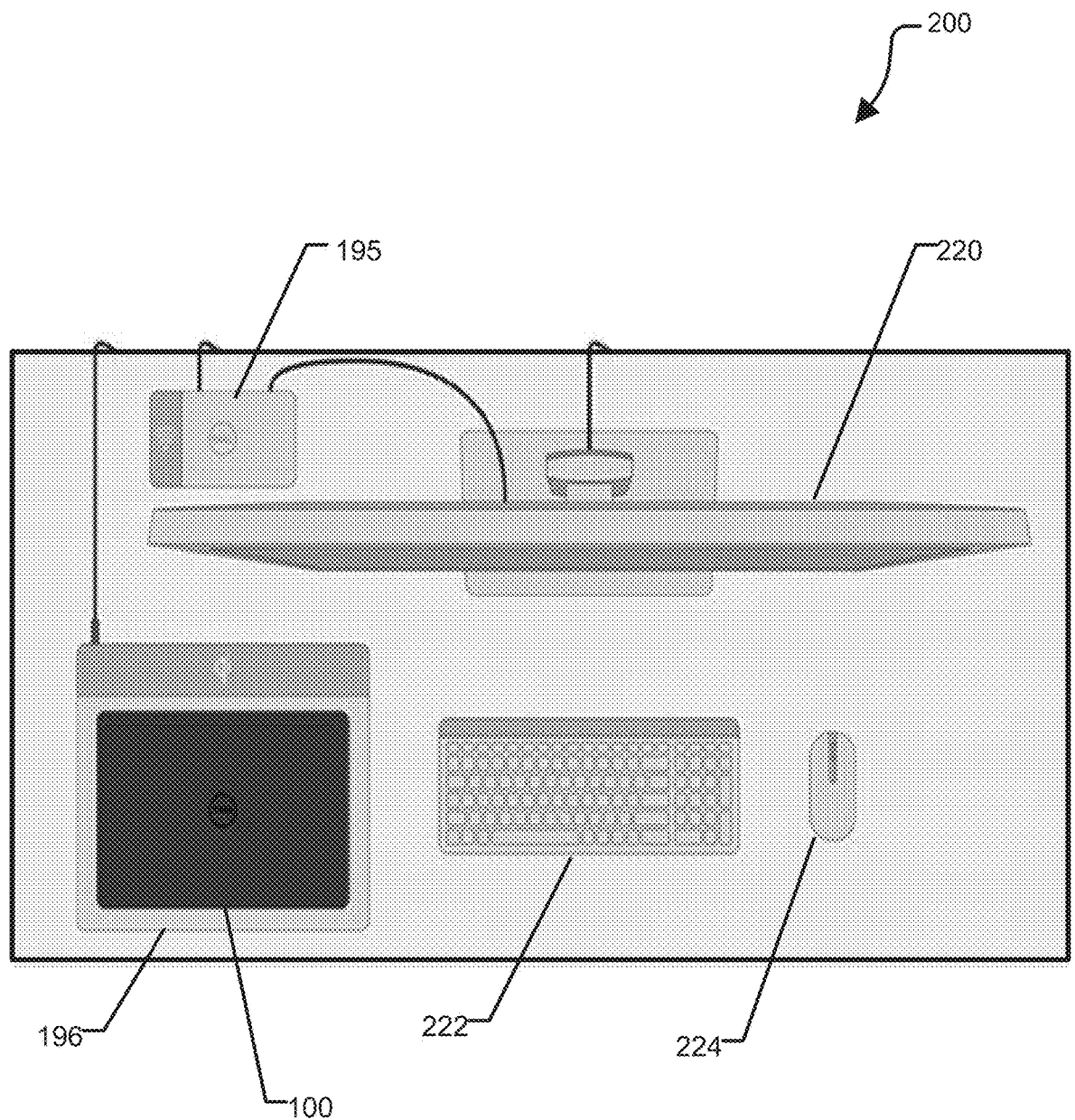
FIG. 2 is a perspective view of an information handling system workplace according to a specific embodiment of the present disclosure.

FIG. 2 shows a typical information handling system workplace 200 according to a specific embodiment of the present disclosure. Workplace 200 includes wireless docking station 195, wireless charging pad 196, information handling system 100, a display device 220, a keyboard 222, and a pointing device (mouse) 224. Wireless docking station 195 is electrically coupled to wireless charging pad 196, typically via a USB interface. Dock 195 further includes electrical connection ports to interface with display device 220. Docking station 195 can be configured to communicate with keyboard 222 and/or mouse 224, either wirelessly or via a wired interface such as a USB. By placing information handling system 100 onto the surface of wireless charging pad 196, wireless charging can commence, and in addition, a wireless dock connection can be established between system 100 and docking station 195. The disclosed techniques are described in detail below with reference to FIGS. 3-5.

Figure 3:
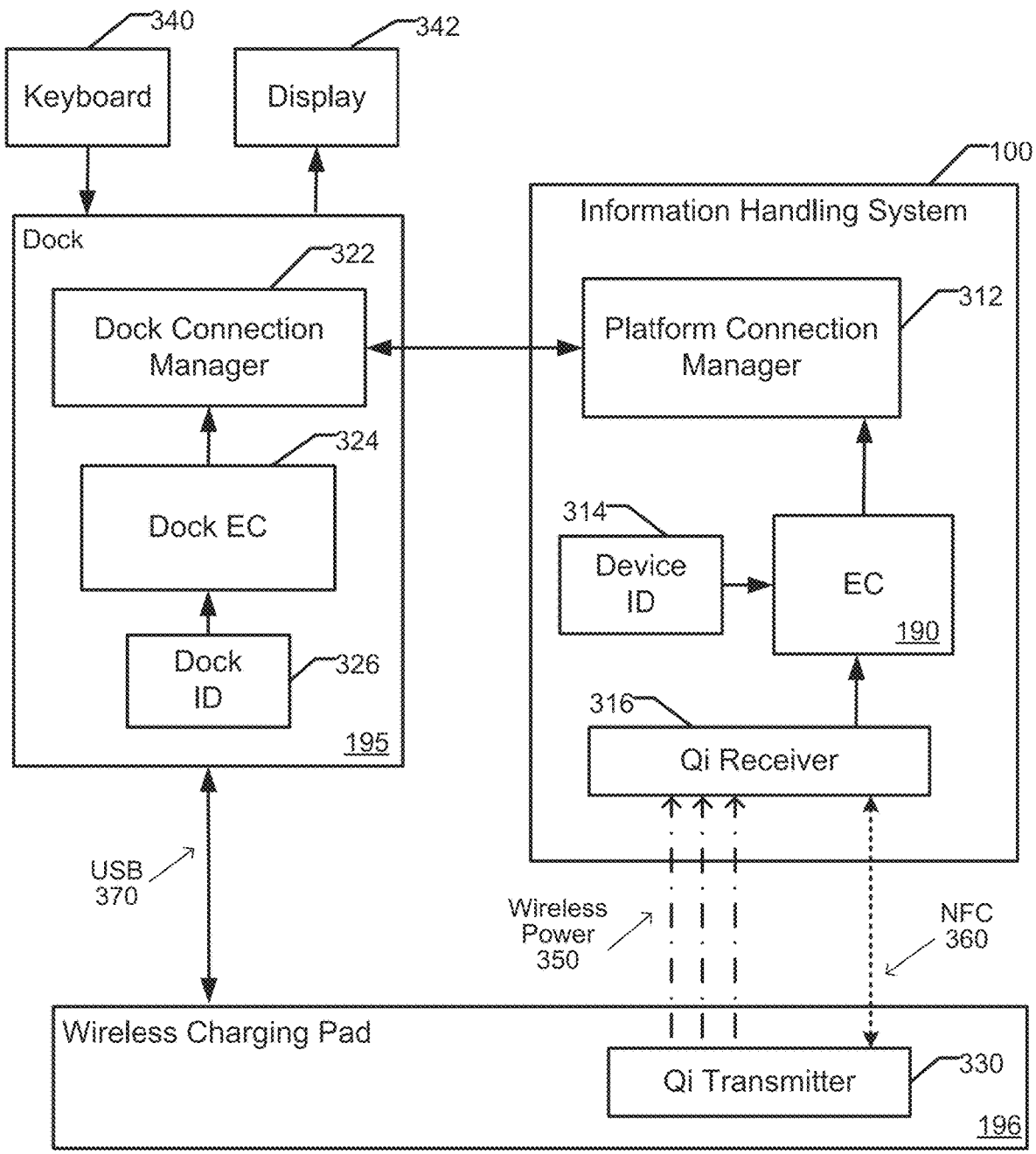
FIG. 3 is a block diagram illustrating a detailed view of selected components of FIG. 2 according to a specific embodiment of the present disclosure.

FIG. 3 shows a detailed view of selected components of FIG. 2 according to a specific embodiment of the present disclosure. FIG. 3 shows information handling system 100, wireless docking station 195, and wireless charging pad 196. Information handling system 100 includes a platform connection manager 312, EC 190, a unique platform device identifier 314, and a Qi wireless power receiver 316. In an embodiment, platform connection manager 312 can be implemented using a software process executing at EC 190. Device ID 314 can be stored at a memory device at platform EC 190 or may be stored elsewhere at information handling system 100. Wireless docking station 195 includes a dock connection manager 322, a dock EC 324, and a dock ID 326. Wireless docking station 195 further includes wired and/or wireless interfaces to couple dock 195 with a keyboard 340 and a display device 342. Wireless docking station 195 is electrically coupled to charging pad 196 via a USB 370. Dock connection manager 322 can be implemented using a software process executing at dock EC 324. Wireless charging pad 196 includes a Qi wireless power transmitter 330. During operation, transmitter 330 is inductively coupled to receiver 316 to couple power 350 from charging pad 196 to information handling system 100. Transmitter 330 and receiver 316 include circuitry to provide an NFC data interface 360.

During operation, an OS service executing at information handling system 100 is configured to deliver device ID 314, received from platform EC 190, to dock EC 324 via wireless charging pad 196 using NFC 360 and USB 370. In particular, a firmware service at charging pad 196 is configured to forward platform device ID 314 from system 100 to an OS service executing at dock 195, and to forward dock ID 326 from dock EC 324 to a service executing at platform EC 190.

Figure 4:
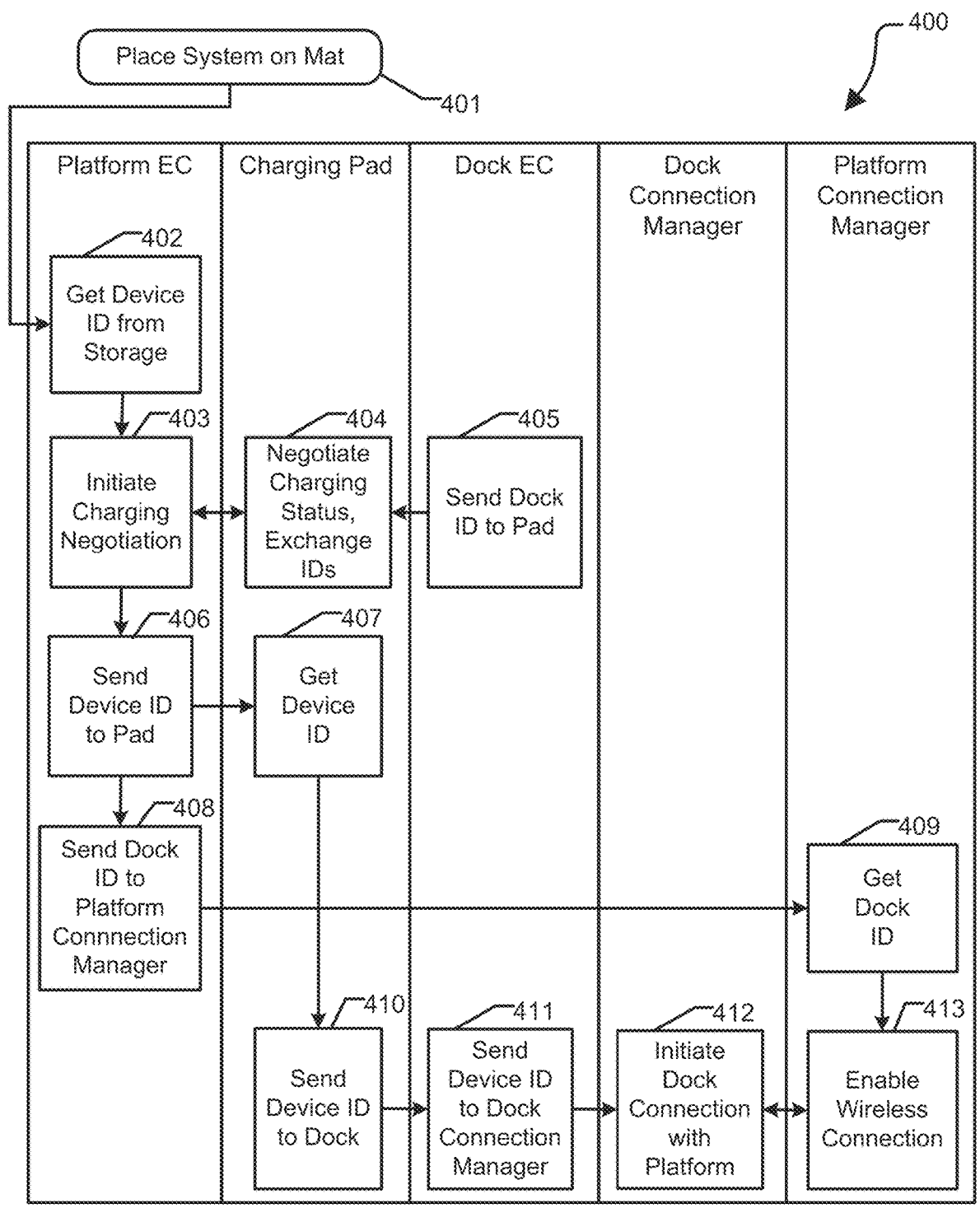
FIG. 4 is a flow diagram illustrating a method for initiating a connection between a wireless docking station and an information handling system according to a specific embodiment of the present disclosure.

FIG. 4 shows a method 400 for initiating a connection between a wireless docking station and an information handling system according to a specific embodiment of the present disclosure. Method 400 begins at block 401 where an information handling system is placed onto the surface of a wireless charging pad. For example, information handling system 100 can be placed onto wireless charging pad 196, as shown at FIGS. 2 and 3. At block 402, EC 190 retrieves platform device ID 314 from storage at system 100. At block 403, information handling system 100 and wireless charging pad 196 negotiate for wireless charging by determining charging characteristics suitable for system 100. At block 404, charging pad 196 facilitates the exchange of identifiers between a wireless docking station, such as dock 195, and information handling system 100. For example, at block 405, dock EC 324 at wireless docking station 195 can retrieve dock ID 326 from storage, and provide the dock ID to charging pad 196 via USB 370. Charging pad 196 can then forward the dock ID to platform EC 190 via NFC 360. Similarly, at block 406 platform EC 190 can forward platform device ID 314 to charging pad 196 via NFC 360, and charging pad 196 receives the platform device ID at block 407.

Method 400 continues at block 408 where EC 190 at information handling system 100 sends dock ID 326 to platform connection manager 312 at system 100. The dock ID is received at platform connection manger 312 at block 409. Similarly, wireless charging pad 196 forwards platform device ID 314 to dock EC 324 at dock 195 via USB 370, as shown at block 410. At block 411, dock EC 324 sends platform device ID 314 to dock connection manager 322. At this point in time, platform connection manager 312 has received dock ID 326, and dock connection manager 322 has received platform device ID 314. At block 412, dock connection manager 322 initiates a dock connection with platform connection manager 312, and method 400 concludes at block 413 where information platform connection manager establishes a wireless dock connection with dock connection manger 322. In an embodiment, additional authentication may be required to complete the establishment of a dock connection with an information handling system that is place on charging pad 196. For example, dock connection manager 322 may request a password or the like from platform connection manager 312, such as a password provided by a user of information handling system 100.

As described above, establishing a dock connection between information handling system 100 and wireless docking station 195 is performed in response to determining that system 100 was placed onto wireless charging pad 196. After a dock connection is established with an information handling system on charging pad 196, other information handling systems that may be within a wireless communication range of dock 195 are not permitted to establish a wireless dock connection with dock 195. In an embodiment, wireless docking station 195 may terminate a previously established wireless dock connection with a different information handling system that was not placed on charging pad 196 in response to determining that another system has been placed onto the charging pad. In a situation where more than one information handling systems are within a suitable range to dock 195 to support a wireless dock connection, and none of the systems are placed on charging pad 196, docking station 195 can utilize other selection criteria to determine the system to which a connection is established.

Figure 5:
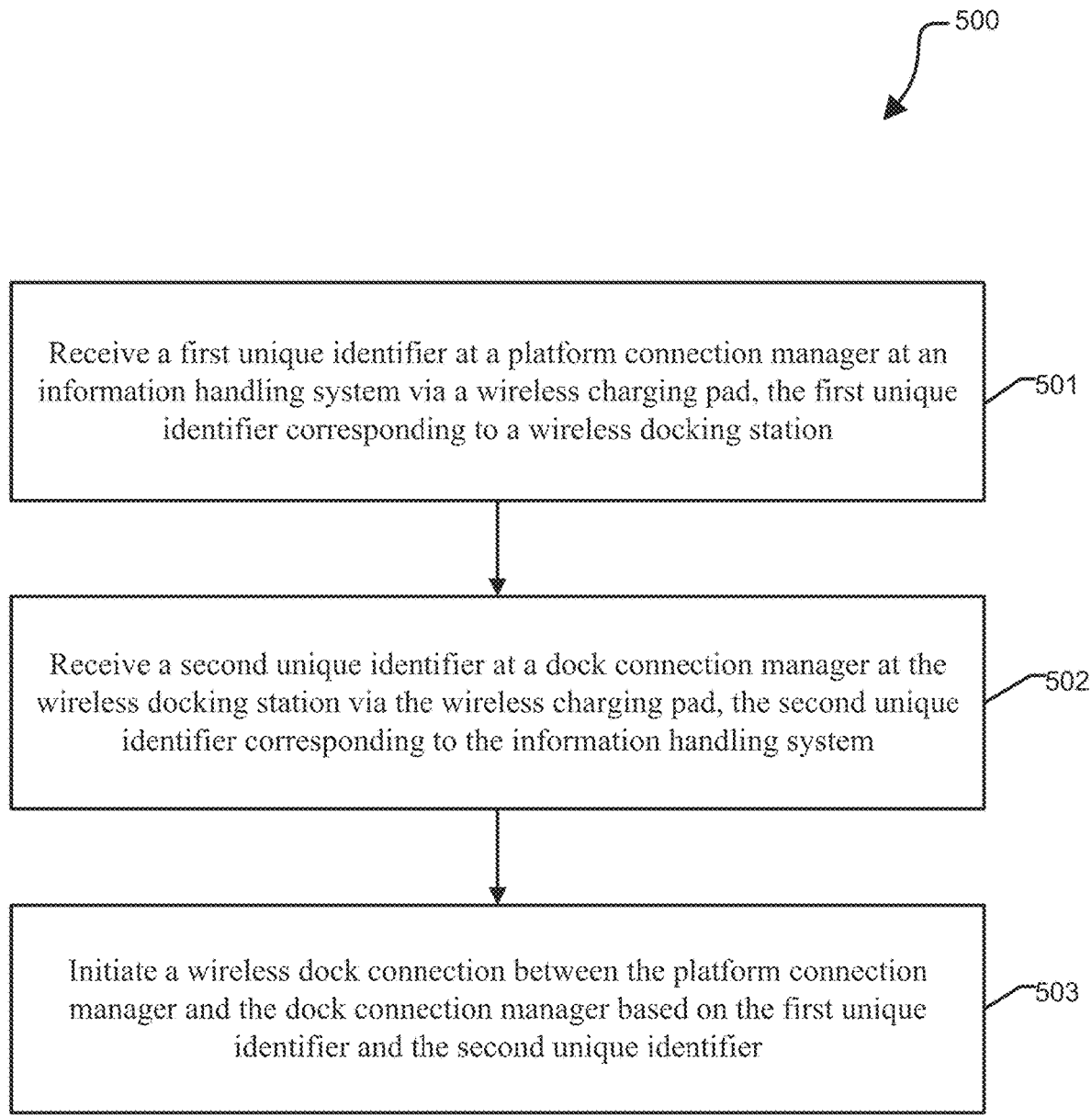
FIG. 5 is a flow diagram illustrating a method for initiating a connection between a wireless docking station and an information handling system according to another embodiment of the present disclosure.

FIG. 5 shows a method 500 for initiating a connection between a wireless docking station and an information handling system according to another embodiment of the present disclosure. Method 500 begins at block 501 where a first unique identifier is received at a platform connection manager at an information handling system via a wireless charging pad, the first unique identifier corresponding to a wireless docking station. For example, wireless docking station 195 can send dock ID 326 to wireless charging pad 196 via USB 370, and charging pad 196 can send the received dock ID to information handling system 100 via NFC 360. Method 500 continues at block 502 where a second unique identifier is received at a dock connection manager at the wireless docking station via the wireless charging pad, the second unique identifier corresponding to the information handling system. For example, information handling system 100 can send platform device ID 314 to wireless charging pad 196 via NFC 360, and charging pad 196 can send the received device ID to dock 195 via USB 370. Method 500 completes at block 503 where a wireless dock connection is initiated between the platform connection manager and the dock connection manager based on the first unique identifier and the second unique identifier.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   determining that an information handling system is placed on a wireless charging pad, the wireless charging pad communicatively coupled to a wireless docking station;
   in response to the information handling system being placed on the wireless charging pad, terminating a previously established wireless dock connection between the wireless docking station and a different information handling system not placed on the wireless charging pad;
   receiving, at the wireless charging pad, a first unique identifier from the wireless docking station; and
   initiating a wireless dock connection between the wireless docking station and the information handling system in response to receiving the first unique identifier.

2. The method of claim 1, further comprising:
   receiving a second unique identifier from the information handling system at the wireless charging pad.

3. The method of claim 2, further comprising providing the second unique identifier to an embedded controller at the wireless docking station.

4. The method of claim 1, further comprising providing the first unique identifier to an embedded controller included at the information handling system.

5. The method of claim 1, further comprising receiving the first unique identifier at an embedded controller at the information handling system.

6. The method of claim 1, further comprising:
receiving the first unique identifier at a platform connection manager at the information handling system;
receiving a second unique identifier corresponding to the information handling system at a dock connection manager at the wireless docking station; and
initiating a wireless dock connection between the wireless docking station and the information handling system based on the first unique identifier and the second unique identifier.

7. The method of claim 1, wherein the wireless charging pad and the information handling system are communicatively coupled by a near-field wireless communication interface.

8. The method of claim 1, wherein the wireless charging pad and the wireless docking station are communicatively coupled by a universal serial bus interface.

9. An information handling system comprising:
an embedded controller configured to provide a wireless dock connection between the information handling system and a wireless docking station;
a wireless charging power receiver configured to receive power from a wireless charging pad, wherein in response to the information handling system being placed on the wireless charging pad, a previous wireless dock connection is terminated between the wireless docking station and a different information handling system not placed on the wireless charging pad; and
the embedded controller further configured to:
initiate charging negotiation with the wireless charging pad;
receive a first unique identifier from the wireless docking station via the wireless charging pad; and
initiate the wireless dock connection between the wireless docking station and the information handling system in response to receiving the first unique identifier.

10. The information handling system of claim 9, wherein the embedded controller is further configured to provide a second unique identifier identifying the information handling system to the wireless charging pad.

11. The information handling system of claim 10, wherein the wireless charging pad is configured to provide the second unique identifier to manager second embedded controller at the wireless docking station.

12. The information handling system of claim 9, wherein the wireless charging pad is configured to provide the first unique identifier to the embedded controller included at the information handling system.

13. The information handling system of claim 9, wherein the embedded controller is further configured to provide the first unique identifier to the embedded controller.

14. The information handling system of claim 9, further comprising a second embedded controller at the wireless docking station to further provide the wireless dock connection.

15. The information handling system of claim 9, wherein the wireless charging pad and the information handling system are communicatively coupled by a near-field wireless communication interface.

16. The information handling system of claim 9, wherein the wireless charging pad and the wireless docking station are communicatively coupled by a universal serial bus interface.

17. A method comprising:
receiving a first unique identifier at a first embedded controller at an information handling system, the first unique identifier corresponding to a first wireless docking station, the first unique identifier received at the first embedded controller via a wireless charging pad electrically coupled to the wireless docking station;
in response to the information handling system being placed on the wireless charging pad, terminating a previous connection between the wireless docking station and a different information handling system not placed on the wireless charging pad;
receiving a second unique identifier at a second embedded controller at the wireless docking station, the second unique identifier corresponding to the information handling system, the second unique identifier received at the second embedded controller via the wireless charging pad; and
initiating a wireless dock connection between the first embedded controller and the second embedded controller based on the first unique identifier and the second unique identifier.

18. The method of claim 17, wherein receiving the first unique identifier is in response to placing the information handling system on the wireless charging pad.

19. The method of claim 17, wherein the wireless charging pad and the information handling system are communicatively coupled by a near-field wireless communication interface.

20. The method of claim 17, wherein the wireless charging pad and the wireless docking station are communicatively coupled by a universal serial bus interface.

* * * * *